United States Patent

Cooper

[15] 3,660,152
[45] May 2, 1972

[54] COATED WOVEN MATERIALS

[72] Inventor: Michael Lakin Cooper, Welwyn Garden City, England

[73] Assignee: Imperial Chemical Industries Limited, London, England

[22] Filed: May 21, 1970

[21] Appl. No.: 39,551

[30] Foreign Application Priority Data

June 2, 1969 Great Britain.....................27,719/69

[52] U.S. Cl..................117/138.8 E, 117/161 UZ, 161/92, 161/402, 229/53
[51] Int. Cl..........................................B44d 1/00, D03d 1/04
[58] Field of Search ..........................161/92, 170, 252, 402; 99/171 LP; 139/420 R; 117/138.8 E, 161 UZ; 260/896, 897 A

[56] References Cited

UNITED STATES PATENTS

| | | | |
|---|---|---|---|
| 3,445,055 | 5/1969 | Port et al. | 161/92 |
| 2,983,704 | 5/1961 | Roedel | 117/138.8 E |
| 3,218,224 | 11/1965 | Osborn | 161/402 |
| 3,036,987 | 5/1962 | Ranalli | 117/138.8 E |
| 2,683,138 | 7/1954 | Goering et al. | 260/896 |
| 3,200,173 | 8/1965 | Schilling | 260/897 A |
| 3,176,052 | 3/1965 | Peticolas | 260/897 A |

*Primary Examiner*—Robert F. Burnett
*Assistant Examiner*—Linda C. Koeckert
*Attorney*—Cushman, Darby & Cushman

[57] ABSTRACT

A woven web of tapes made from a blend of from 50 to 90 percent of a crystalline polyolefine and from 10 to 50 percent of another polyolefine coated with a polyolefine based coating composition.

5 Claims, No Drawings

COATED WOVEN MATERIALS

The present invention relates to coated woven materials and in particular to such materials which are suitable for the production of sacks.

It is already known to produce webs by weaving tapes of crystalline polyolefines especially polypropylene. The tapes that are used are generally uniaxially oriented along their length and this uniaxial orientation substantially improves the strength of the tapes along their length and thus the warp and weft tapes together give rise to particularly strong materials. However, for many applications, especially sacks, it is desirable that the material should be impermeable to liquids and vapors in particular to water.

It has already been proposed that sacks made from woven tapes of polypropylene should be coated with polyethylene to render them impermeable to water. It is however important that the coating should adhere firmly to the woven web so that it will not peel off when the laminate is subjected to heavy handling. We have found that the adhesion of polyethylene to polypropylene tapes is not sufficient to enable the coated material to be used in applications where it is likely to be subjected to rough handling.

According to the present invention we provide a laminated web consisting of a woven layer and a continuous coating thereon in which the woven layer is made by interweaving tapes which are made from a blend containing from 50 to 90 percent by weight of said blend of a crystalline polyolefine and from 50 to 10 percent by weight of any other polyolefine and the coating thereon contains an olefine polymer.

The crystalline polyolefine in the blend used to produce the tapes used in the woven layers of the present invention may be a homopolymer or a copolymer and examples of suitable materials include polypropylene, high density polyethylene, poly-4-methyl pentene-1 and poly-3-methyl butene, copolymers of the olefines from which these polymers are derived may be used although this is not preferred because the copolymers tend to be more expensive than the homopolymers. Similarly, for economic reasons it is preferred that the crystalline polyolefine be polypropylene or high density polyethylene and polypropylene is particularly preferred because it has good tensile properties. The other polyolefine which is blended with the crystalline polyolefine may also be crystalline or it may be another polyolefine such as "low density" polyethylene. Polyethylene of any density is our preferred material because of its ready availability and cheapness.

The olefine polymer upon which the coating materials used to coat the webs of the present invention are based may be a homopolymer, a copolymer or may also be a blend of an olefine polymer with another thermoplastic. We prefer that at least part of the coating composition is the same as the crystalline polyolefine from which the tapes are made. For example if the tapes are of a blend of polypropylene and polythene it is preferred that the coating material contains polypropylene or polyethylene; it is particularly preferred that the coating material be a blend of polypropylene and polyethylene. In particular we prefer that the coating material should contain at least 60 percent of polyethylene because it is difficult to extrusion coat with blends containing less polyethylene. Examples of copolymers which may be used in the coating compositions include ethylene/propylene copolymers and ethylene/vinyl acetate copolymers.

The tapes used to produce the woven layer of the webs of the present invention may be made in any suitable manner and may be uniaxially or biaxially oriented. We prefer that the tapes are uniaxially oriented. The tapes may conveniently be prepared by extruding the blend in the form of a film which may be flat or tubular. The extruded film may then be drawn at a temperature above its melting point to produce a sheet of the required thickness. The sheet is then normally slit into ribbons or tapes of the appropriate width which are then stretched to orient them at a temperature below the melting point of the polyolefinic materials. In the preferred situation where the tapes are uniaxially oriented they are stretched only along their axis. The temperature below the crystalline melting point at which the tapes are stretched depends upon the nature of the crystalline polyolefine. Generally the temperature is no more than 60° C. below the melting point of the polyolefine. If the blend consists predominantly of polypropylene the preferred temperature range for stretching is between 110° C. and 170° C.; preferably between 130° C. and 150° C. The extent to which the polymer is stretched at the temperature below its melting point is normally at least five times and preferably at least seven times. These tapes may then be woven into a web.

The coating may then be applied to the woven web by normal extrusion coating techniques in which the coating is extruded from a slot die onto the woven web and the coated side of the web immediately contacted with a water cooled roll. Another suitable method for applying the coating is to use a melt-roll coater. In a melt-roll coater the coating material is milled in a two roll mill, the rolls being at a temperature above the melting point of the coating material. The two rolls being driven at different speeds so that the coating material preferentially adheres to the faster roll, the web to be coated is then passed through the nip formed between another roll and the faster roll so that the coating material is transferred to the web.

We have found that by employing a blend as the tape forming material the adhesion between the coating and the web is so improved that the coated webs may be used in applications where they are subjected to particularly rough treatment and the coating will not peel off. Accordingly the webs are particularly useful for the manufacture of sacks.

The present invention is illustrated but in no way limited by the following Examples.

EXAMPLES 1 to 4

Blends of polypropylene and polyethylene were extruded at about 250° C. from a slot die and cast into a water bath. The film thus produced was slit into tapes 0.25 of an inch wide and the tapes drawn at 130° C. at a draw ratio of 7:1. The tapes were then woven into a web having 10 warp tapes and 10 weft tapes per inch.

Each sample of cloth was then extrusion coated with polythene. The coating was extruded at about 295° C. onto the web which was travelling at 200 ft/minute. The coating was 25 microns thick.

The adhesion or "peel strength" of the coating was measured on a 1-inch wide strip of the laminate by clamping the coating in one clamp of a tensometer and the woven cloth in the other clamp and measuring the force required to pull them apart at a constant speed of 20 cm/minute.

|  | % Polythene in the tapes | % Polypropylene in tapes | Peel Strength grams/inch |
|---|---|---|---|
| Example 1 | 0 | 100 | 20 |
| Example 2 | 10 | 90 | 190 |
| Example 3 | 20 | 80 | 210 |
| Example 4 | 30 | 70 | 170 |

I claim:

1. A laminated web consisting of a layer woven from oriented plastic tapes and a continuous coating thereon in which the woven layer is made by interweaving tapes made from a blend containing from 50 to 90 percent by weight of a crystalline polypropylene and from 50 to 10 percent by weight of a polyethylene and the coating contains at least 60 percent by weight of polyethylene.

2. A laminated web according to claim 1 in which the polyethylene in the blend from which the tapes are made is a crystalline polyethylene.

3. A laminated web according to claim 1 in which the coating composition also contains a copolymer of ethylene.

4. A laminated web according to claim 1 in which the tapes which are interwoven are uniaxially oriented.

5. A laminated web as in claim 1 wherein the blend contains 10–30 percent by weight polyethylene.

* * * * *